United States Patent
Matsuda

(10) Patent No.: US 10,447,100 B2
(45) Date of Patent: Oct. 15, 2019

(54) MOTOR

(71) Applicant: Nidec Corporation, Minami-ku, Kyoto (JP)

(72) Inventor: Shigekatsu Matsuda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 306 days.

(21) Appl. No.: 15/613,933

(22) Filed: Jun. 5, 2017

(65) Prior Publication Data
US 2017/0366063 A1   Dec. 21, 2017

Related U.S. Application Data

(60) Provisional application No. 62/351,683, filed on Jun. 17, 2016.

(51) Int. Cl.
*H02K 1/27* (2006.01)
*H02K 5/167* (2006.01)
*H02K 11/33* (2016.01)

(52) U.S. Cl.
CPC ......... *H02K 1/2786* (2013.01); *H02K 5/1672* (2013.01); *H02K 11/33* (2016.01)

(58) Field of Classification Search
CPC .......................... H02K 1/2786; H02K 5/1672
See application file for complete search history.

(56) References Cited

U.S. PATENT DOCUMENTS

| | | | | |
|---|---|---|---|---|
| 5,497,040 A | * | 3/1996 | Sato ................... | H02K 1/187 310/156.26 |
| 5,610,464 A | * | 3/1997 | Asano ................. | H02K 29/03 310/156.45 |
| 5,877,572 A | | 3/1999 | Michaels et al. | |

(Continued)

FOREIGN PATENT DOCUMENTS

| CN | 1232580 A | 10/1999 |
|---|---|---|
| CN | 202197196 U | 4/2012 |

(Continued)

OTHER PUBLICATIONS

SIPO Office Action corresponding to Application No. 201710455339.4; dated Jan. 15, 2019.

(Continued)

*Primary Examiner* — Robert W Horn
(74) *Attorney, Agent, or Firm* — Cantor Colburn LLP

(57) ABSTRACT

A motor includes a stationary unit and a rotary unit. The rotary unit includes a shaft, a magnet, and a rotor holder for holding the magnet on an inner circumferential surface thereof The rotor holder includes a top surface portion extending in a direction orthogonal to a center axis, a first surface portion extending radially outward from a radial outer end portion of the top surface portion, a second surface portion positioned axially below the top surface portion and having an outer diameter larger than an outer diameter of the first surface portion, a first connecting portion arranged to connect a radial outer end portion of the first surface portion and a radial outer end portion of the second surface portion, and a second connecting portion arranged to connect the radial outer end portion of the top surface portion and a radial inner end portion of the second surface portion.

10 Claims, 6 Drawing Sheets

(56) References Cited

U.S. PATENT DOCUMENTS

| | | | | |
|---|---|---|---|---|
| 5,977,672 | A * | 11/1999 | Vacca | F16C 33/08 29/596 |
| 6,166,470 | A * | 12/2000 | Miyazawa | H02K 1/145 310/181 |
| 6,396,190 | B1 * | 5/2002 | Ahn | D06F 37/304 310/429 |
| 6,570,288 | B1 * | 5/2003 | Kaizuka | H02K 1/2786 310/156.01 |
| 6,648,511 | B2 * | 11/2003 | Smith | F16C 23/045 384/209 |
| 6,977,453 | B2 * | 12/2005 | Yoda | H02K 11/048 310/156.26 |
| 7,019,423 | B1 * | 3/2006 | Horng | G11B 19/2009 310/51 |
| RE39,416 | E * | 12/2006 | Shin | H02K 1/2786 310/63 |
| 7,397,158 | B2 * | 7/2008 | Lee | D06F 37/304 310/156.26 |
| 7,541,713 | B2 * | 6/2009 | Cheng | F04D 29/646 310/216.123 |
| 7,612,475 | B2 * | 11/2009 | Yao | F04D 25/088 310/67 R |
| 7,732,970 | B2 * | 6/2010 | Buttner | H02K 1/22 310/216.004 |
| 8,137,079 | B2 * | 3/2012 | Yamazaki | F04D 25/0613 417/354 |
| 8,378,540 | B2 | 2/2013 | Furukawa et al. | |
| 2009/0064727 | A1 * | 3/2009 | Choi | D06F 37/206 68/140 |
| 2011/0169358 | A1 | 7/2011 | Furukawa et al. | |
| 2012/0326538 | A1 | 12/2012 | Yoshida et al. | |
| 2015/0188383 | A1 | 7/2015 | Okada et al. | |
| 2017/0070107 | A1 * | 3/2017 | Lee | H02K 1/2786 |
| 2017/0201148 | A1 | 7/2017 | Haga et al. | |
| 2017/0302127 | A1 | 10/2017 | Sakuragi | |
| 2017/0366062 | A1 | 12/2017 | Matsuda et al. | |
| 2017/0366063 | A1 * | 12/2017 | Matsuda | H02K 5/1672 |
| 2018/0140145 | A1 | 5/2018 | Hayamitsu | |

FOREIGN PATENT DOCUMENTS

| | | |
|---|---|---|
| CN | 103326501 A | 9/2013 |
| CN | 103545965 A | 1/2014 |
| CN | 206948107 U | 1/2018 |
| JP | 2007082368 A | 3/2007 |
| JP | 2011256919 A | 12/2011 |
| JP | 2013099094 A | 5/2013 |

OTHER PUBLICATIONS

USPTO Non-Final Office Action corresponding to U.S. Appl. No. 15/613,912; dated Mar. 11, 2019.

Matsuda; "Motor"; U.S. Appl. No. 15/613,912, filed Jun. 5, 2017.

Matsuda; "Rotor and Motor"; U.S. Appl. No. 62/351,683, filed Jun. 17, 2016.

* cited by examiner

MOTOR

CROSS REFERENCE TO RELATED APPLICATION

The present invention claims priority under 35 U.S.C. § 119 to U.S. Application No. 62/351,683 filed Jun. 17, 2016, the entire content of which is incorporated herein by reference.

FIELD OF THE INVENTION

The present invention relates to a motor.

DESCRIPTION OF THE RELATED ART

Conventionally, a rotor holder for holding a magnet is known. For example, the rotor holder is in the form of a lid having a top plate portion and a cylindrical portion. The magnet is held on the inner circumferential surface of the cylindrical portion. For example, Japanese Patent Laid-Open Publication No. 2006-109575 discloses a small motor having a rotor case fixed to a shaft at the center.

FIG. 4 is an enlarged sectional view of one side of a conventional rotor holder with respect to a center axis as a center. Conventionally, there is known a rotor holder in which the upper surface of the rotor holder has a planar surface extending in a direction perpendicular to a center axis and which includes a cylindrical portion extending axially downward from the outer edge of the planar surface. A magnet is fixed to the inner surface of the cylindrical portion. In this case, the rigidity of the rotor holder is low. Therefore, when the motor rotates, the natural frequency of the rotor holder may resonate and a noise may be generated in some cases.

By increasing the rigidity of the rotor holder, it is possible to shift the natural frequencies of the rotor holder and the motor. For example, by increasing the thickness of the rotor holder, it is possible to increase the rigidity of the rotor holder. However, as the thickness increases, the space inside the rotor holder narrows. In order to accommodate a magnet inside the rotor holder, it is necessary to make the rotor holder large. Thus, the size of the motor is increased.

SUMMARY OF THE INVENTION

In accordance with an aspect of the present invention, there is provided a motor, including: a stationary unit including a stator core; and a rotary unit rotatably supported with respect to the stationary unit, wherein the rotary unit includes a shaft arranged to rotate about a center axis extending in a vertical direction, a magnet arranged to radially face an outer circumferential surface of the stator core, and a cylindrical rotor holder arranged to rotate together with the shaft and to hold the magnet on an inner circumferential surface thereof, and the rotor holder includes a top surface portion extending in a direction orthogonal to the center axis, a first surface portion extending radially outward from a radial outer end portion of the top surface portion, a second surface portion positioned axially below the top surface portion and having an outer diameter larger than an outer diameter of the first surface portion, a first connecting portion arranged to connect a radial outer end portion of the first surface portion and a radial outer end portion of the second surface portion, and a second connecting portion arranged to connect the radial outer end portion of the top surface portion and a radial inner end portion of the second surface portion.

The above and other elements, features, steps, characteristics and advantages of the present invention will become more apparent from the following detailed description of the preferred embodiments with reference to the attached drawings.

According to a motor of one exemplary embodiment of the present invention, by increasing the rigidity of a rotor holder while suppressing an increase in the size of the motor, it is possible to increase the natural frequency of the rotor holder.

DETAILED DESCRIPTION OF THE PREFERRED EMBODIMENTS

Figure 1:
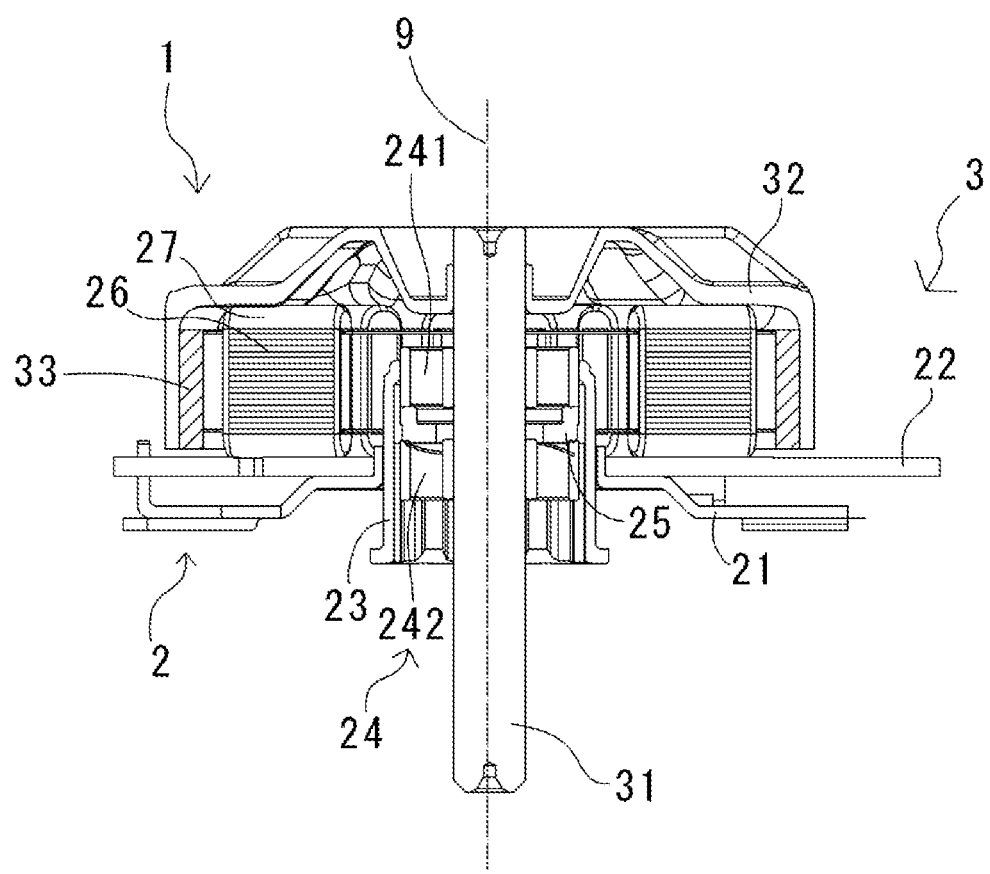
FIG. 1 is a vertical sectional view of a motor.

In the subject specification, in the direction parallel to the center axis, the upper side in FIG. 1 will be referred to as "upper side", and the lower side in FIG. 1 will be simply referred to as "lower side". The expressions "upper side" and "lower side" do not necessarily have to coincide with the direction of gravity. In addition, the radial direction about the center axis will be simply referred to as "radial direction", the circumferential direction about the central axis will be simply referred to as "circumferential direction", and the direction parallel to the central axis will be simply referred to as "axial direction".

FIG. 1 is a vertical sectional view of a motor 1 according to the present embodiment. As shown in FIG. 1, the motor 1 preferably includes a stationary unit 2 and a rotary unit 3. The stationary unit 2 is relatively stationary with respect to a frame body of a device to be driven. The rotary unit 3 is rotatably supported with respect to the stationary unit 2.

The stationary unit 2 of the present embodiment preferably includes a mounting plate 21, a circuit board 22, a bearing holder 23, a bearing unit 24, a spacer 25, a stator core 26, and a coil 27.

The mounting plate 21 is a plate member that extends in a direction orthogonal to the central axis 9. As the material of the mounting plate 21, a metal having higher rigidity than the circuit board 22 is used. For example, a galvanized steel sheet, SUS, an aluminum alloy, or the like is used as the material of the mounting plate 21. The mounting plate 21 is fixed to the frame body of the device to be driven.

The circuit board 22 is arranged on the upper surface of the mounting plate 21. As the circuit board 22, for example, a glass epoxy board or a paper phenol board is used. Further, on the circuit board 22, an electronic circuit for supplying a drive current to the coil 27 is mounted.

The bearing unit 24 is a mechanism that rotatably supports a shaft 31 on the side of the rotary unit 3. The bearing unit 24 of the present embodiment preferably includes a first bearing 241 and a second bearing 242. The second bearing 242 is disposed below the first bearing 241.

The spacer 25 is arranged between the first bearing 241 and the second bearing 242. The upper end portion of the spacer 25 is in contact with the outer race of the first bearing 241. The lower end portion of the spacer 25 is in contact with the outer race of the second bearing 242. As a result, the axial distance between the first bearing 241 and the second bearing 242 is maintained.

The stator core 26 is fixed to the bearing holder 23 above the mounting plate 21. The stator core 26 is formed by a laminated steel plate in which electromagnetic steel plates such as silicon steel plates or the like are laminated in the axial direction. The stator core 26 preferably includes an annular core back and a plurality of teeth protruding radially outward from the core back.

The teeth are arranged at substantially equal intervals in the circumferential direction. A coil 27 is attached to each tooth. The coil 27 is constituted by a conductive wire wound around each tooth.

The rotary unit 3 of the present embodiment preferably includes a shaft 31, a rotor holder 32, and a magnet 33.

The shaft 31 is a columnar member extending along the central axis 9. As the material of the shaft 31, for example, a metal such as stainless steel or the like is used. While being supported by the bearing unit 24, the shaft 31 rotates about the central axis 9 extending in the vertical direction. The upper end portion of the shaft 31 protrudes upward beyond the first bearing 241. Further, the lower end portion of the shaft 31 protrudes downward beyond the second bearing 242. The lower end portion of the shaft 31 is connected to, for example, a drive unit of OA (office automation) equipment, via a power transmission mechanism such as gears or the like.

The rotor holder 32 is a metal member that rotates together with the shaft 31. The rotor holder 32 is formed by pressing a thin plate. The thin plate is made of, for example, a magnetic material which is a metal. The rotor holder 32 holds the magnet 33 on the inner circumferential surface thereof.

The magnet 33 rotates together with the shaft 31 and the rotor holder 32. As the magnet 33, for example, a ferrite magnet or a neodymium magnet is used. The magnet 33 of the present embodiment is annular. The magnet 33 faces the outer circumferential surface of the stator core 26 in the radial direction. That is, the inner circumferential surface of the magnet 33 faces a plurality of teeth of the stator core 26 in the radial direction. N poles and S poles are alternately magnetized in the circumferential direction on the inner circumferential surface of the magnet 33.

Instead of the annular magnet 33, a plurality of magnets may be used. In this case, the plurality of magnets may be arranged in the circumferential direction so that the magnetic pole surfaces of an N pole and the magnetic pole surfaces of an S pole are alternately arranged side by side.

When a drive current is supplied to the coil 27 via the circuit board 22, a radial magnetic flux is generated in each tooth of the stator core 26. Then, due to the action of the magnetic flux between the teeth and the magnet 33, a circumferential torque is generated. As a result, the rotary unit 3 rotates about the center axis 9 with respect to the stationary unit 2. When the rotary unit 3 rotates, power is transmitted to a driving unit connected to the shaft 31.

Figure 2:
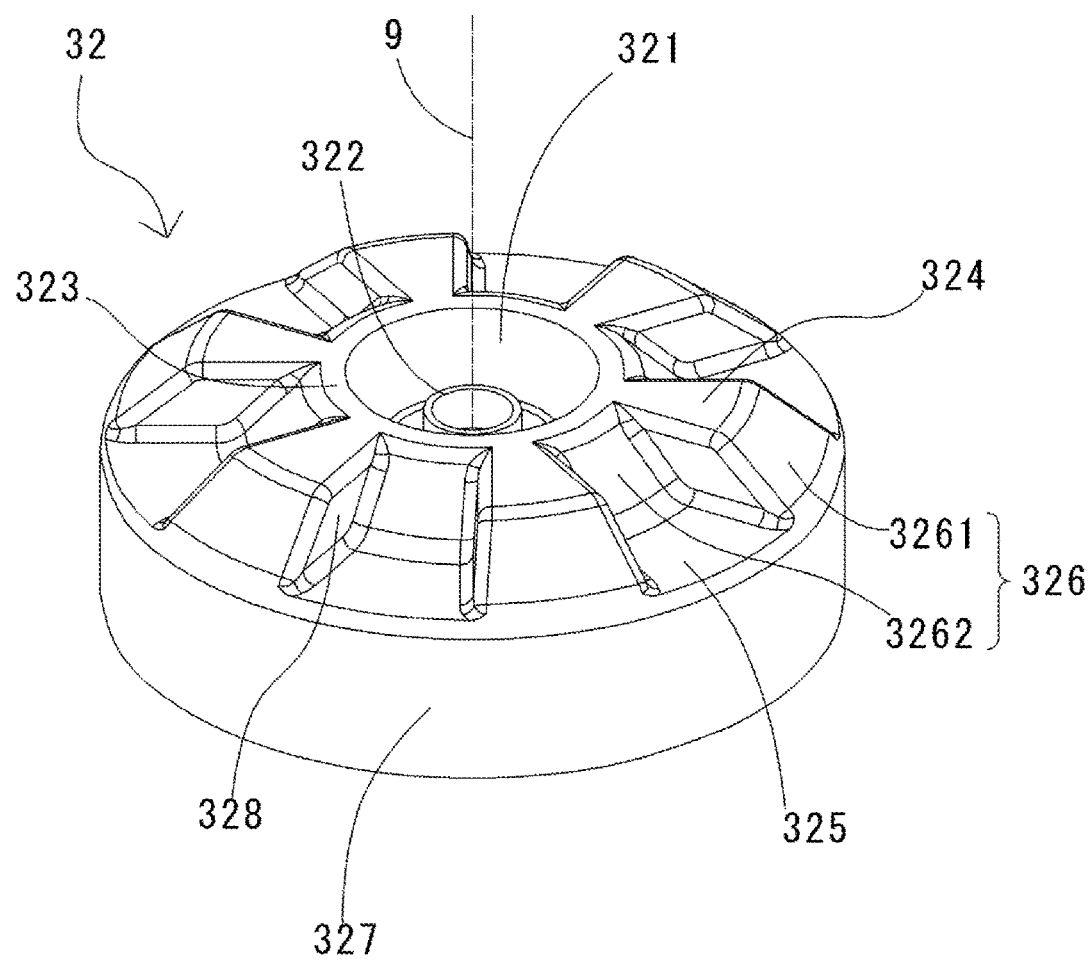
FIG. 2 is a perspective view of a rotor holder.

FIG. 2 is a perspective view of the rotor holder 32 as seen obliquely from above. In the present embodiment, the rotor holder 32 is formed by pressing a thin plate. The thin plate is made of, for example, a magnetic material which is a metal. The rotor holder 32 may be formed by injection molding of a resin. The rotor holder 32 has a lid shape opened downward. The stator core 26 and the coil 27 are arranged inside the rotor holder 32. The rotor holder 32 preferably includes a through-hole 321, a boss portion 322, a top surface portion 323, a first surface portion 324, a second surface portion 325, a connecting portion 326, and a cylindrical portion 327.

The rotor holder 32 includes the through-hole 321 extending along the center axis 9. The shaft 31 is disposed in the through-hole 321. The rotor holder 32 includes the boss portion 322 disposed at a position adjacent to the radial outer side of the through-hole 321. That is, the rotor holder 32 includes the cylindrical boss portion 322 extending in the axial direction around the center axis 9 on the radial inner side of the top surface portion 323. The boss portion 322 is fixed to the upper portion of the shaft 31.

The top surface portion 323 is annular and extends in a direction orthogonal to the central axis 9. The first surface portion 324 extends radially outward from the radial outer end portion of the top surface portion 323. That is, the first surface portion 324 has an outer diameter larger than that of the top surface portion 323. The second surface portion 325 is located on the axial lower side of the top surface portion 323 and has an outer diameter larger than that of the first surface portion 324. In the present embodiment, the first surface portion 324 extends in a direction orthogonal to the central axis 9. That is, the first surface portion 324 is flush with the top surface portion 323.

The expression that the outer diameter of the first surface portion 324 is larger than the outer diameter of the top surface portion 323 includes a case where the maximum outer diameter of the first surface portion 324 is larger than the maximum outer diameter of the top surface portion 323. That is, the expression that the outer diameter of the first surface portion 324 is larger than the outer diameter of the top surface portion 323 also includes a case where the outer diameter of a part of the first surface portion 324 is smaller than the maximum outer diameter of the top surface portion 323 as long as the maximum outer diameter of the first surface portion 324 is larger than the maximum outer diameter of the top surface portion 323.

The expression that the outer diameter of the second surface portion 325 is larger than the outer diameter of the first surface portion 324 includes a case where the maximum outer diameter of the second surface portion 325 is larger than the maximum outer diameter of the first surface portion 324. That is, the expression that the outer diameter of the second surface portion 325 is larger than the outer diameter of the first surface portion 324 also includes a case where the outer diameter of a part of the second surface portion 325 is smaller than the maximum outer diameter of the first surface portion 324 as long as the maximum outer diameter of the second surface portion 325 is larger than the maximum outer diameter of the first surface portion 324.

The connecting portion 326 preferably includes a first connecting portion 3261 and a second connecting portion 3262. The first connecting portion 3261 connects the radial outer end portion of the first surface portion 324 and the radial outer end portion of the second surface portion 325. The rotor holder 32 includes the cylindrical portion 327 that holds the magnet 33 on the inner circumferential surface thereof. The cylindrical portion 327 extends downward from the radial outer end of the second surface portion 325. In the present embodiment, the first connecting portion 3261 connects the radial outer end portion of the first surface portion 324 and the axial upper end portion of the cylindrical portion 327. The first connecting portion 3261 is an inclined surface whose outer diameter increases from the axial upper side toward the axial lower side. Accordingly, the first surface portion 324 and the second surface portion 325 are supported in both the radial direction and the axial direction. This makes it possible to increase the rigidity of the rotor holder 32.

The second connecting portion 3262 connects the radial outer end portion of the top surface portion 323 and the radial inner end portion of the second surface portion 325. The second connecting portion 3262 is an inclined surface whose outer diameter increases from the axial upper side toward the axial lower side. Thus, the top surface portion 323 and the second surface portion 325 are supported in both the radial direction and the axial direction. This makes it possible to increase the rigidity of the rotor holder 32.

The first connecting portion 3261 and the second connecting portion 3262 are adjacent to each other in the circumferential direction. That is, the first connecting portion 3261 preferably includes an axially-extending wall surface 328 on the circumferentially-facing surface side to which the second connecting portion 3262 is adjacent. Thus, the second connecting portion 3262 serves as a beam for supporting the top surface portion 323 and the cylindrical portion 327, thereby increasing the rigidity of the rotor holder 32. Accordingly, it is possible to increase the natural frequency of the rotor holder 32 and to suppress the noise due to resonance.

Figure 3:
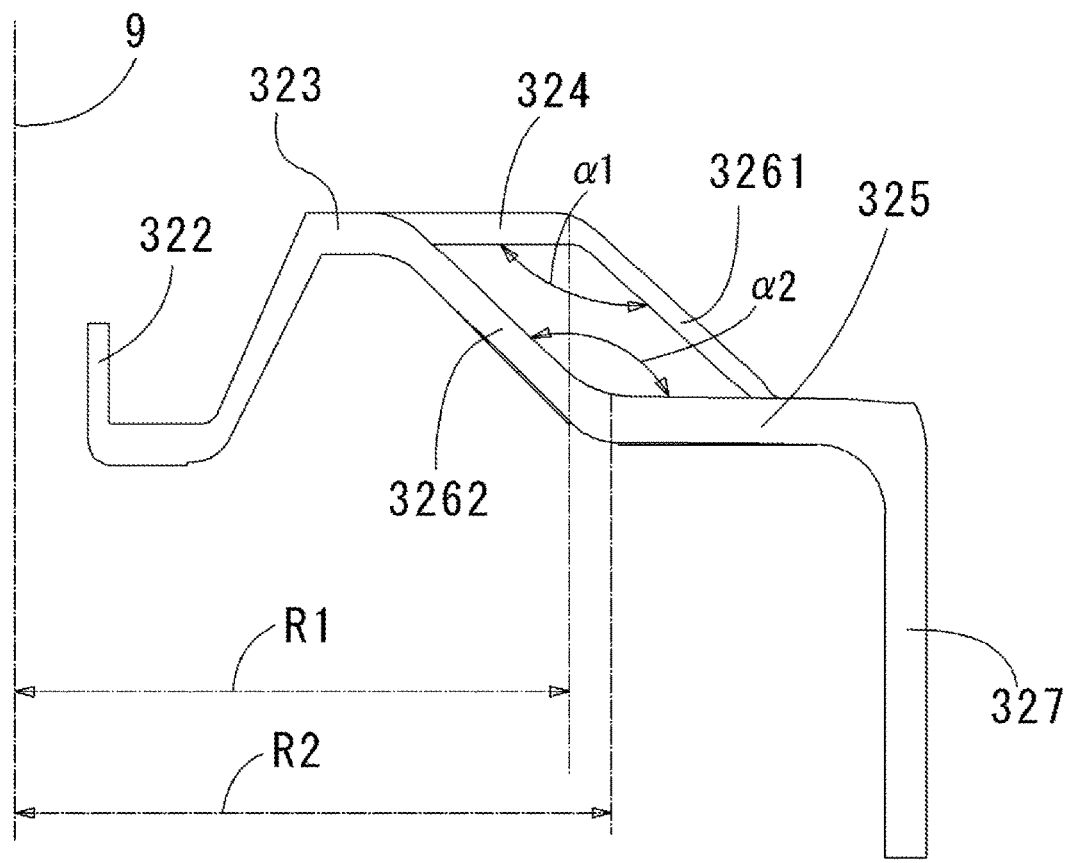
FIG. 3 is an enlarged sectional view of the rotor holder.

FIG. 3 is an enlarged sectional view of the rotor holder 32. In the present embodiment, when viewed in the radial direction, the angle α2 between the second connecting portion 3262 and the second surface portion 325 is an obtuse angle. When viewed from the radial direction, the angle α1 between the first connecting portion 3261 and the first surface portion 324 is an obtuse angle. When viewed in the radial direction, the angle α2 between the second connecting portion 3262 and the second surface portion 325 is equal to the angle α1 between the first connecting portion 3261 and the first surface portion 324. Preferably, the first radial dimension R1 which is the outer diameter of a location where the first connecting portion 3261 and the first surface portion 324 are connected is different from the second radial dimension R2 which is the outer diameter of a location where the second connecting portion 3262 and the second surface portion 325 are connected. For example, the second radial dimension R2 is larger than the first radial dimension R1. By making these radial dimensions different from each other, the rotor holder 32 can be made to have a more rigid structure. It is therefore possible to increase the rigidity of the rotor holder 32.

In the present embodiment, the first surface portion 324 and the second surface portion 325 extend in a direction orthogonal to the center axis 9. The first surface portion 324 is parallel to the second surface portion 325. That is, the wall surface 328 is a parallelogram. Thus, it is possible to distribute the force applied to the top surface portion 323 and the cylindrical portion 327. This makes it possible to increase the rigidity of the rotor holder 32. The wall surface 328 may have a triangular shape. In addition, the first connecting portion 3261 and the first surface portion 324, or the second connecting portion 3262 and the second surface portion 325, may be respectively connected by one curved surface.

Figure 5:
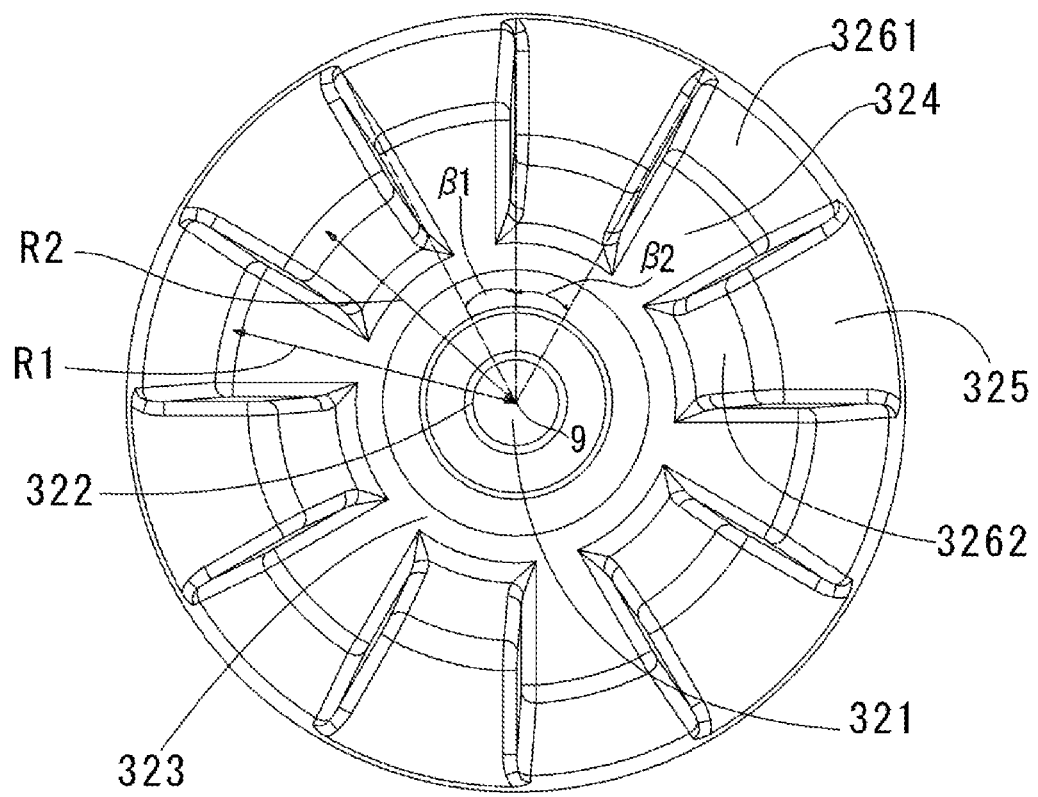
FIG. 5 is a plan view of the rotor holder.

FIG. 5 is a plan view of the rotor holder 32 as seen from above. In the present embodiment, the rotor holder 32 preferably includes a plurality of first surface portions 324 and a plurality of second surface portions 325. The first surface portions 324 and the second surface portions 325 are alternately arranged in the circumferential direction. The divergence angle β1 from one circumferential side to the other circumferential side of each of the first surface portions 324 around the center axis 9 is equal to the divergence angle β2 from one circumferential side to the other circumferential side of each the second surface portions 325. The first surface portions 324 and the second surface portions 325 are arranged at equal intervals in the circumferential direction. Thus, the rigidity of the rotor holder 32 is improved over the entire circumference. Accordingly, it is possible to increase the natural frequency of the rotor holder 32 and to suppress the noise due to resonance. The divergence angle β1 of each of the first surface portions 324 and the divergence angle β2 of each of the second surface portions 325 are not limited to the one described above and may be different from each other. At least one of the first surface portions 324 and the second surface portions 325 may have a different divergence angle. The divergence angles β1 and β2 may be chosen in a timely manner. In addition, the first surface portions 324 and the second surface portions 325 may not be arranged at equal intervals in the circumferential direction but may be arranged at unequal intervals.

Figure 4:
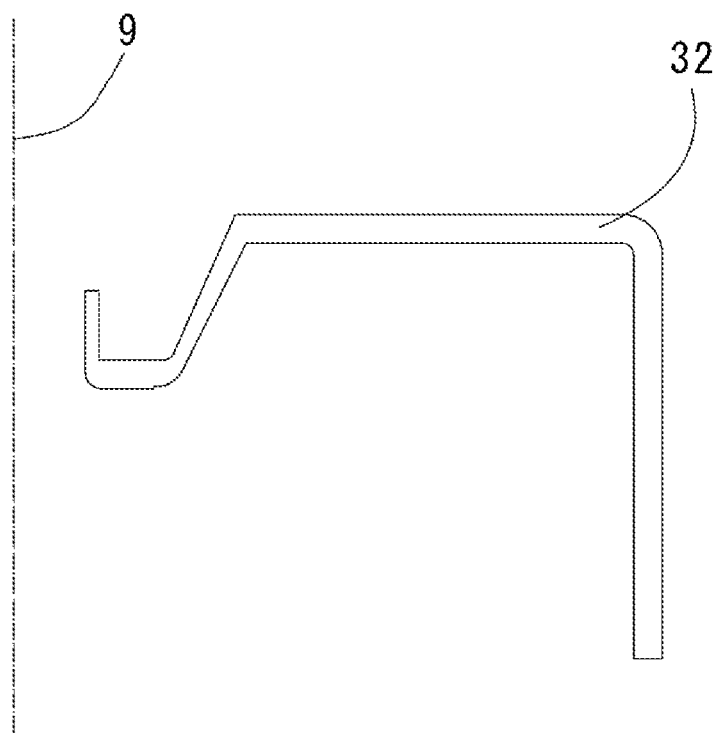
FIG. 4 is an enlarged sectional view of a conventional rotor holder.
Figure 6:
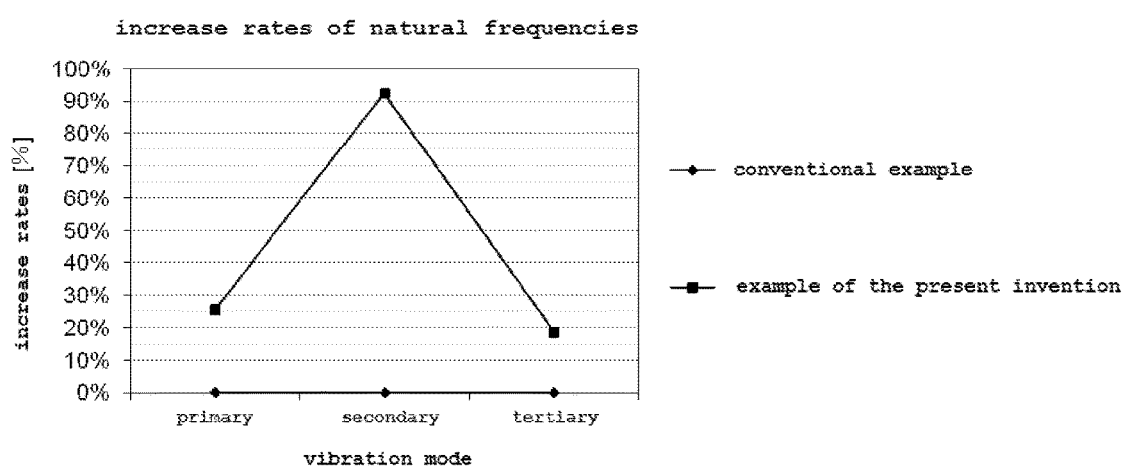
FIG. 6 is a graph showing the increase rates of natural frequencies in an example of the present invention and a conventional example.

FIG. 6 is a graph showing the increase rates of the natural frequencies in the example of the present invention and the conventional example. In the conventional example shown in FIG. 4, the upper surface of the rotor holder 32 is a planar surface extending in a direction perpendicular to the center axis 9. The vibration mode indicated on the horizontal axis of the graph shows the respective modes of a specific natural frequency. The secondary vibration mode is a vertical vibration mode of the rotor holder 32. The natural frequency in the example shown in FIG. 2 is increased by 92% of the natural frequency in the conventional example in the secondary vibration mode.

According to the present invention, the motor 1 can be used for transportation equipment such as motor vehicles or the like, home appliances, medical equipment, disk drives, blower fans, and so forth.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor, comprising:
   a stationary unit including a stator core; and
   a rotary unit rotatably supported with respect to the stationary unit,
   wherein the rotary unit includes a shaft arranged to rotate about a center axis extending in a vertical direction, a magnet arranged to radially face an outer circumferential surface of the stator core, and a cylindrical rotor holder arranged to rotate together with the shaft and to hold the magnet on an inner circumferential surface thereof, and
   the rotor holder includes a top surface portion extending in a direction orthogonal to the center axis, a first surface portion extending radially outward from a radial outer end portion of the top surface portion, a second surface portion positioned axially below the top surface portion and having an outer diameter larger than an outer diameter of the first surface portion, a first connecting portion arranged to connect a radial outer end portion of the first surface portion and a radial outer end portion of the second surface portion, and a second connecting portion arranged to connect the radial outer end portion of the top surface portion and a radial inner end portion of the second surface portion.

2. The motor of claim 1, wherein when viewed in a radial direction, an angle between the second connecting portion and the second surface portion is equal to an angle between the first connecting portion and the first surface portion.

3. The motor of claim 1, wherein a first radial dimension which is an outer diameter of a location where the first connecting portion and the first surface portion are connected is different from a second radial dimension which is an outer diameter of a location where the second connecting portion and the second surface portion are connected.

4. The motor of claim 3, wherein the second radial dimension is larger than the first radial dimension.

5. The motor of claim 1, wherein the first connecting portion is an inclined surface whose outer diameter increases from an axial upper side toward an axial lower side.

6. The motor of claim 1, wherein the second connecting portion is an inclined surface whose outer diameter increases from an axial upper side toward an axial lower side.

7. The motor of claim 1, wherein the first connecting portion and the second connecting portion are adjacent to each other in a circumferential direction, and the first connecting portion includes an axially-extending wall surface on a circumferentially-facing surface side to which the second connecting portion is adjacent.

8. The motor of claim 1, wherein the first surface portion and the second surface portion extend in a direction orthogonal to the center axis, and the first surface portion is parallel to the second surface portion.

9. The motor of claim 1, wherein the rotor holder includes a plurality of first surface portions and a plurality of second surface portions, the first surface portions and the second surface portions are alternately arranged in a circumferential direction, a divergence angle from one circumferential side to the other circumferential side of each of the first surface portions around the center axis is equal to a divergence angle from one circumferential side to the other circumferential side of each the second surface portions, and the first surface portions and the second surface portions are arranged at equal intervals in the circumferential direction.

10. The motor of claim 1, wherein the rotor holder includes a cylindrical boss portion disposed on a radial inner side of the top surface portion and extending in an axial direction around the center axis, and an upper portion of the shaft is fixed to the boss portion.

* * * * *